(12) United States Patent
Dong et al.

(10) Patent No.: US 10,921,534 B2
(45) Date of Patent: Feb. 16, 2021

(54) OPTICAL MODULE STRUCTURE AND FABRICATION METHOD FOR OPTICAL MODULE STRUCTURE

(71) Applicant: Huawei Technologies Co., Ltd., Shenzhen (CN)

(72) Inventors: Zhen Dong, Dongguan (CN); Jun Liu, Dongguan (CN); Li Zeng, Shenzhen (CN); Qing Zhao, Shenzhen (CN); Xiaolu Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/692,041

(22) Filed: Nov. 22, 2019

(65) Prior Publication Data

US 2020/0096715 A1  Mar. 26, 2020

Related U.S. Application Data

(63) Continuation of application No. PCT/CN2017/085436, filed on May 23, 2017.

(51) Int. Cl.
*G02B 6/42* (2006.01)

(52) U.S. Cl.
CPC ............ *G02B 6/4224* (2013.01); *G02B 6/42* (2013.01); *G02B 6/4245* (2013.01);
(Continued)

(58) Field of Classification Search
CPC .. G02B 6/4224; G02B 6/4228; G02B 6/4238; G02B 6/4245
See application file for complete search history.

(56) References Cited

U.S. PATENT DOCUMENTS 5,499,312 A    3/1996  Hahn et al.
7,255,491 B2*  8/2007  Takagi ............... G02B 6/4225
                                                       385/88
(Continued)

FOREIGN PATENT DOCUMENTS

CN    101226261 A    7/2008
CN    102356337 A    2/2012
(Continued)

OTHER PUBLICATIONS

English Translation for CN—106207743A retrieved via WIPO IP Portal, 9 pages (2020). (Year: 2020).*
(Continued)

*Primary Examiner* — Daniel Petkovsek
(74) *Attorney, Agent, or Firm* — Conley Rose, P.C.

(57) ABSTRACT

An optical module structure includes a substrate, an optical chip and an electrical chip that are fixedly coupled to the substrate. The optical module structure further includes an optical coupling structure fixedly coupled to the optical chip. A side of the optical chip that faces the substrate has a first reference plane, and at least one first alignment mark is provided on the first reference plane. The optical coupling structure has a second reference plane, and at least one second alignment mark is provided on the second reference plane. The first reference plane is aligned with the second reference plane, and the first alignment mark is aligned with the second alignment mark.

11 Claims, 3 Drawing Sheets

(52) U.S. Cl.
CPC .......... *G02B 6/4257* (2013.01); *G02B 6/4228* (2013.01); *G02B 6/4238* (2013.01); *G02B 6/4269* (2013.01); *G02B 6/4274* (2013.01)

(56) References Cited

U.S. PATENT DOCUMENTS

| | | | |
|---|---|---|---|
| 7,279,720 B2 | 10/2007 | Fang et al. | |
| 7,931,411 B2 * | 4/2011 | Kurita | G02B 6/4239 |
| | | | 385/88 |
| 8,107,776 B2 * | 1/2012 | Wang | G02B 6/1221 |
| | | | 385/14 |
| 8,855,452 B2 * | 10/2014 | Andry | G02B 6/4204 |
| | | | 385/33 |
| 8,971,676 B1 * | 3/2015 | Thacker | G02B 6/12 |
| | | | 385/14 |
| 9,046,666 B2 * | 6/2015 | Yoda | G02B 6/4202 |
| 9,217,836 B2 * | 12/2015 | Asghari | G02B 6/423 |
| 9,335,500 B2 | 5/2016 | McLaren et al. | |
| 9,377,587 B2 * | 6/2016 | Taylor | G02B 6/421 |
| 9,645,331 B1 * | 5/2017 | Kim | G02B 6/4243 |
| 9,933,574 B1 * | 4/2018 | Zhang | G02B 6/4214 |
| 10,025,047 B1 * | 7/2018 | Liu | G02B 6/4243 |
| 2006/0269288 A1 * | 11/2006 | Guidotti | G02B 6/4214 |
| | | | 398/135 |
| 2012/0002931 A1 | 1/2012 | Watanabe | |
| 2012/0207426 A1 | 8/2012 | Doany et al. | |
| 2013/0022323 A1 * | 1/2013 | Takizawa | G02B 6/4233 |
| | | | 385/92 |
| 2013/0163916 A1 | 6/2013 | Kim et al. | |
| 2014/0010498 A1 * | 1/2014 | Verslegers | G02B 6/30 |
| | | | 385/37 |
| 2014/0086540 A1 | 3/2014 | Chen et al. | |
| 2017/0176684 A1 * | 6/2017 | Miller | G02B 6/30 |

FOREIGN PATENT DOCUMENTS

| | | | |
|---|---|---|---|
| CN | 106207743 A | * 12/2016 | ............ G02B 6/34 |
| CN | 106207743 A1 | 12/2016 | |
| EP | 2549328 A1 | 1/2013 | |
| WO | 2006088859 A2 | 8/2006 | |

OTHER PUBLICATIONS

Hayakawa, A., et al., "A 25 Gbps silicon photonic transmitter and receiver with a bridge structure for CPU interconnects," Optical Fiber Communications Conference and Exhibition (OFC), 2015, 3 pages.

* cited by examiner

OPTICAL MODULE STRUCTURE AND FABRICATION METHOD FOR OPTICAL MODULE STRUCTURE

CROSS-REFERENCE TO RELATED APPLICATIONS

This application is a continuation of International Patent Application No. PCT/CN2017/085436 filed on May 23, 2017. The disclosure of the aforementioned application is hereby incorporated by reference in its entirety.

TECHNICAL FIELD

This application relates to the field of optical communications technologies, and in particular, to an optical module structure and a fabrication method for the optical module structure.

BACKGROUND

With rapid development of cloud computing, big data, high-definition videos, virtual reality (VR) technologies, and the like, broadband requires a larger network capacity such that high-speed and large-capacity optical interconnections become a basis for constructing a high-speed network in the future. The key to implement a large-capacity optical interconnection is an optical module having a large data capacity. However, currently, an optical module has relatively low encapsulation density and relatively few channels, and it is difficult to support the optical interconnection for a large amount of data.

SUMMARY

An embodiment of this application provides an optical module structure. The optical module structure includes a substrate, and an optical chip and an electrical chip that are fixedly connected to the substrate such that the optical chip and the electrical chip are encapsulated on the same substrate. A hybrid encapsulation manner is used such that encapsulation density of the optical module structure is increased, and channels of the optical module structure are increased when an area is the same to support an optical interconnection for a large amount of data. In addition, the optical module structure provided in this embodiment of this application further includes an optical coupling structure fixedly connected to the optical chip. A side that is of the optical chip and that faces the substrate has a first reference plane, and at least one first alignment mark is provided on the first reference plane, and the optical coupling structure has a second reference plane, and at least one second alignment mark is provided on the second reference plane. The first reference plane is aligned with the second reference plane, and the first alignment mark is aligned with the second alignment mark to implement alignment. This passive alignment manner that is convenient and quick is used such that an error caused by manual alignment is avoided, and alignment precision is relatively high.

In an implementation, the optical coupling structure has a first vertical plane perpendicular to the second reference plane, and when the optical chip is optically coupled to the optical coupling structure, the first vertical plane is aligned with an end face on a side that is of the optical chip and that faces the optical coupling structure.

In an implementation, the optical coupling structure and the optical chip are coupled through evanescent wave coupling, edge coupling, or vertical coupling.

In an implementation, when the optical coupling structure and the optical chip are coupled through evanescent wave coupling, an optical waveguide in the optical coupling structure is coupled to an optical waveguide in the optical chip using the first reference plane of the optical chip and the second reference plane of the optical coupling structure, where a waveguide direction that is of the optical waveguide in the optical chip and that is at a coupling location faces the first vertical plane, and a waveguide direction that is of the optical waveguide in the optical coupling structure and that is at the coupling location is parallel and opposite to the waveguide direction that is of the optical waveguide in the optical chip and that is at the coupling location.

In an implementation, when the optical coupling structure and the optical chip are coupled through edge coupling, an optical waveguide in the optical coupling structure is coupled to an optical waveguide in the optical chip using a first end face of the optical chip and the first vertical plane of the optical coupling structure, where a waveguide direction that is of the optical waveguide in the optical chip and that is at a coupling location faces the first vertical plane, and a waveguide direction that is of the optical waveguide in the optical coupling structure and that is at the coupling location is parallel and opposite to the waveguide direction that is of the optical waveguide in the optical chip and that is at the coupling location.

In an implementation, when the optical coupling structure and the optical chip are coupled through vertical coupling, an optical waveguide in the optical coupling structure is coupled to an optical waveguide in the optical chip using the first reference plane of the optical chip and the second reference plane of the optical coupling structure, where a waveguide direction that is of the optical waveguide in the optical chip and that is at a coupling location faces the first vertical plane, and a waveguide direction that is of the optical waveguide in the optical coupling structure and that is at the coupling location is perpendicular to the first reference plane and faces the first reference plane.

In an implementation, when the optical coupling structure and the optical chip are coupled through vertical coupling, a grating coupler is further disposed between an optical waveguide in the optical coupling structure and an optical waveguide in the optical chip.

In an implementation, the optical chip and the electrical chip are located side by side on the substrate, and the optical chip and the substrate are fixedly connected in a same manner as the electrical chip and the substrate, to ensure that fastening of the optical chip and the electrical chip can be performed on a same production line, thereby improving generation efficiency of the optical module structure, and reducing generation costs.

Optionally, the optical chip and the substrate are fixedly connected through soldering, and the electrical chip and the substrate are also fixedly connected through soldering.

In an implementation, a monolithically integrated light source is disposed on the optical chip, to improve an integration level of the optical module structure.

In an implementation, a light source chip is fastened on the side that is of the optical chip and that faces the substrate, there is a first groove on a surface on a side that is of the substrate and that faces the optical chip, and the light source chip is located in the first groove to improve an integration level of the optical module structure, and reduce a volume that is of the optical module structure and that is increased due to introduction of the light source chip.

Optionally, there is a second groove on a surface on the side that is of the optical chip and that faces the substrate, and the light source chip is located in the second groove, to further reduce the volume that is of the optical module structure and that is increased due to the introduction of the light source chip.

Optionally, the light source chip and the optical chip are fixedly connected through soldering such that fastening of the optical chip to the light source chip and fastening of the optical chip to the substrate can be completed on a same production line to improve production efficiency.

In an implementation, the optical module structure further includes a heat dissipation structure located on sides that are of the optical chip and the electrical chip and that are away from the substrate, where the heat dissipation structure is at least partially in contact with the optical chip, and at least partially in contact with the electrical chip such that the optical module structure can dissipate heat of the optical chip and the electrical chip at the same time using the heat dissipation structure to improve heat dissipation efficiency of the optical module structure.

An embodiment of this application further provides an encapsulation method for an optical module structure, including fastening an optical chip and an electrical chip to a first surface of a substrate, where a side that is of the optical chip and that faces the substrate has a first reference plane, and at least one first alignment mark is provided on the first reference plane, fabricating an optical coupling structure, where the optical coupling structure has a second reference plane, and at least one second alignment mark is provided on the second reference plane, adjusting the optical coupling structure such that the first reference plane is aligned with the second reference plane, and the first alignment mark is aligned with the second alignment mark, and fastening the optical coupling structure to the optical chip.

In an implementation, fastening an optical chip and an electrical chip to a first surface of a substrate includes separately soldering the optical chip and the electrical chip to the first surface of the substrate.

In an implementation, before fastening an optical chip and an electrical chip to a first surface of a substrate, the method further includes forming a second groove on the optical chip, and fastening a light source chip in the second groove, and forming a first groove on the substrate such that the light source chip is located in the first groove after the optical chip and the electrical chip are fastened to the first surface of the substrate.

According to a fabrication method for the optical module structure provided in this embodiment of this application, the optical chip and the electrical chip are fastened side by side to the substrate in a hybrid encapsulation manner to increase encapsulation density of the optical module structure such that channels of the optical module structure are increased when an area is the same to support an optical interconnection for a large amount of data.

In addition, according to the encapsulation method for the optical module structure provided in this embodiment of this application, the first reference plane is aligned with the second reference plane, and the first alignment mark is aligned with the second alignment mark. This passive alignment manner that is convenient and quick is used such that an error caused by manual alignment is avoided, and alignment precision is relatively high.

In addition, according to the encapsulation method for the optical module structure provided in this embodiment of this application, the substrate and the optical chip, the substrate and the electrical chip, the optical chip and the optical supply chip, and the substrate and a circuit board are all soldering, each are fixedly connected through soldering such that fastening of components in the optical module structure can be performed on a same production line, improving production efficiency of the optical module structure, and reducing production costs.

In an implementation, fabricating an optical coupling structure includes providing an optical coupling medium, and writing an optical waveguide into the optical coupling medium using a femtosecond laser direct writing technique to form the optical coupling structure.

In an implementation, the fabricating an optical coupling structure further includes forming a metal layer on a surface of the optical coupling medium.

In an implementation, the encapsulation method further includes fastening a heat dissipation structure to sides that are of the optical chip and the electrical chip and that are away from the substrate, where the heat dissipation structure is at least partially in contact with the optical chip, and at least partially in contact with the electrical chip such that the optical module structure can dissipate heat of the optical chip and the electrical chip at the same time using the heat dissipation structure to improve heat dissipation efficiency of the optical module structure.

BRIEF DESCRIPTION OF DRAWINGS

To describe the technical solutions in some of the embodiments of this application more clearly, the following briefly describes the accompanying drawings describing the embodiments. The accompanying drawings in the following descriptions merely show some embodiments of this application, and a person of ordinary skill in the art may derive other drawings from these accompanying drawings without creative efforts.

DESCRIPTION OF EMBODIMENTS

The following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application without creative efforts shall fall within the protection scope of this application.

As described in the background, currently, an optical module has relatively low encapsulation density, and relatively few channels, and it is difficult to support an optical interconnection for a large amount of data.

Figure 1:
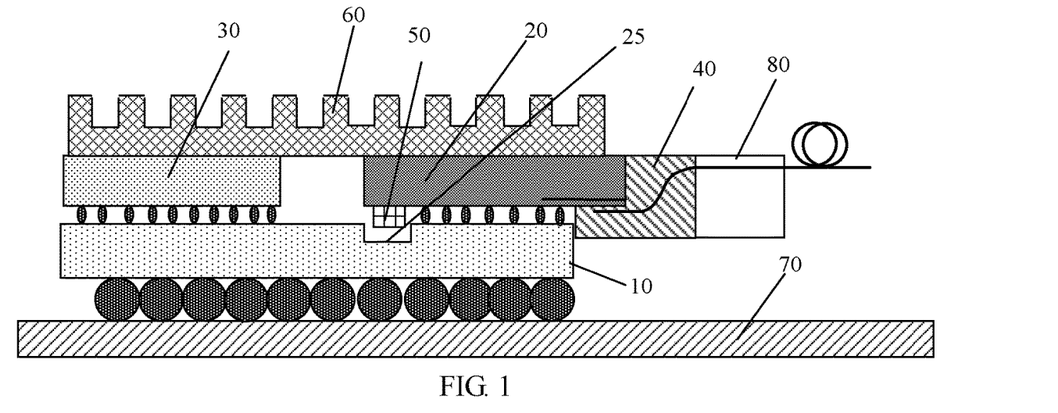
FIG. 1 is a schematic structural diagram of an optical module structure according to an embodiment of this application.

In view of this, an embodiment of this application provides an optical module structure. As shown in FIG. 1, the optical module structure includes a substrate 10, an optical chip 20 and an electrical chip 30 that are fixedly connected to the substrate 10, and an optical coupling structure 40 fixedly connected to the optical chip 20. A side that is of the optical chip 20 and that faces the substrate 10 has a first reference plane, and at least one first alignment mark is provided on the first reference plane, and the optical coupling structure 40 has a second reference plane, and at least one second alignment mark is provided on the second reference plane. The first reference plane is aligned with the second reference plane, and the first alignment mark is aligned with the second alignment mark.

It can be learned from this that, according to the optical module structure provided in this embodiment of this application, the optical chip 20 and the electrical chip 30 are encapsulated on the same substrate 10. A hybrid encapsulation manner is used such that encapsulation density of the optical module structure is increased, and channels of the optical module structure are increased when an area is the same to support an optical interconnection for a large amount of data.

In addition, according to the optical module structure provided in this embodiment of this application, the first reference plane is aligned with the second reference plane, and the first alignment mark is aligned with the second alignment mark to implement alignment. This passive alignment manner that is convenient and quick is used such that an error caused by manual alignment is avoided, and alignment precision is relatively high.

Figure 2:
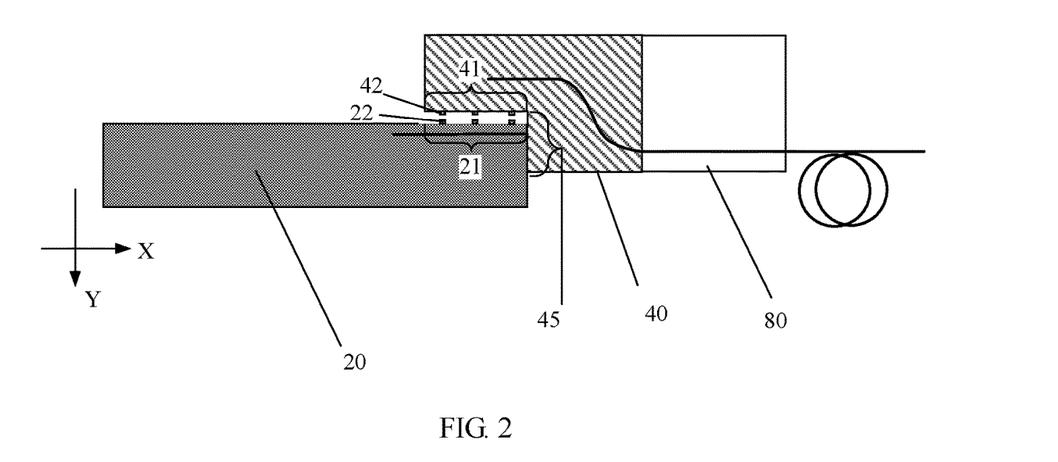
FIG. 2 is a schematic diagram of alignment between an optical chip and an optical coupling structure in an optical module structure according to an embodiment of this application.

As shown in FIG. 2, FIG. 2 shows a process of alignment between the optical chip 20 and the optical coupling structure 40 in the optical module structure according to an embodiment of this application. The alignment process includes first implementing alignment in a first direction X using a first alignment mark 22 on a first reference plane 21 and a second alignment mark 42 on a second reference plane 41. Then implementing alignment in a second direction Y using the first reference plane 21 and the second reference plane 41, and finally, implementing fastening of the optical chip 20 to the optical coupling structure 40.

It should be noted that, in this embodiment of this application, the first alignment mark 22 and the second alignment mark 42 may be in a same pattern, or may be in patterns complementary to each other. This is not limited in this application, and determined based on a situation. It should be further noted that, in an optional embodiment of this application, at least three or four first alignment marks are provided on the first reference plane, and at least three or four second alignment marks are also provided on the second reference plane. Further optionally, the first alignment marks 22 are respectively provided in different directions on a surface of the first reference plane 21, and the second alignment marks 42 are also respectively provided in different directions on a surface of the second reference plane 41 to improve precision of alignment between the optical chip 20 and the optical coupling structure 40.

Based on the foregoing embodiment, in a specific embodiment of this application, that the first reference plane is aligned with the second reference plane and the first alignment mark is aligned with the second alignment mark includes that, in a direction perpendicular to a surface of the substrate 10, a projection of the first reference plane at least partially overlaps a projection of the second reference plane, and a projection of the first alignment mark coincides with a projection of the second alignment mark to implement alignment in a direction from the optical chip 20 to the optical coupling structure 40 in a plane parallel to the surface of the substrate 10. In another embodiment of this application, that the first reference plane is aligned with the second reference plane further includes that, a distance between the first reference plane and the second reference plane satisfies a preset requirement (such as zero or another preset value) to implement alignment between the optical chip 20 and the optical coupling structure 40 in the direction perpendicular to the surface of the substrate 10. However, this is not limited in this application, and determined based on a situation.

Based on any one of the foregoing embodiments, in an embodiment of this application, there is an electrical connection line in the substrate 10, and the electrical chip 30 is electrically connected to the optical chip 20 using the electrical connection line such that during specific application, an electrical signal generated or amplified by the electrical chip 30 can be transmitted to the optical chip 20 using the substrate 10, the optical chip 20 converts the electrical signal into an optical signal, transmits the optical signal to the optical coupling structure 40, and transmits the optical signal out using an optical fiber array 80 that is in communication connection with the optical coupling structure 40.

Further, in an embodiment of this application, the optical chip 20 is a chip having an optical signal transmission/processing function, and has an electrical signal input/output interface and an optical signal input/output interface, thereby implementing mutual conversion between an optical signal and an electrical signal. The electrical chip 30 is a chip including a device such as a drive or a trans-impedance amplifier, and is configured to generate, amplify, and/or receive an electrical signal. The optical coupling structure 40 is located between the optical chip 20 and the optical fiber array 80 to implement optical coupling between the optical chip 20 and the optical fiber array 80.

Based on any one of the foregoing embodiments, in an embodiment of this application, the optical coupling structure 40 has a first vertical plane 45 perpendicular to the second reference plane, and when the optical chip 20 is optically coupled to the optical coupling structure 40, the first vertical plane 45 is aligned with an end face on a side that is of the optical chip 20 and that faces the optical coupling structure 40. Further, in an implementation of this application, the first vertical plane 45 is in direct contact with the end face on the side that is of the optical chip 20 and that faces the optical coupling structure 40, to implement the alignment in the direction from the optical chip 20 to the optical coupling structure 40 in the plane parallel to the surface of the substrate 10.

It should be noted that, in this embodiment of this application, the optical coupling structure 40 and the optical chip 20 may be coupled through evanescent wave coupling, edge coupling, or vertical coupling. This is not limited in this application, and the following provides descriptions with reference to specific embodiments.

As shown in FIG. 1, in an embodiment of this application, the optical coupling structure 40 and the optical chip 20 are coupled through evanescent wave coupling. In this embodiment of this application, an optical waveguide in the optical coupling structure 40 is coupled to an optical waveguide in the optical chip 20 using the first reference plane of the optical chip 20 and the second reference plane of the optical coupling structure 40. A waveguide direction that is of the optical waveguide in the optical chip 20 and that is at a coupling location faces the first vertical plane 45, and a waveguide direction that is of the optical waveguide in the optical coupling structure 40 and that is at the coupling location is parallel and opposite to the waveguide direction that is of the optical waveguide in the optical chip 20 and that is at the coupling location.

Figure 3:
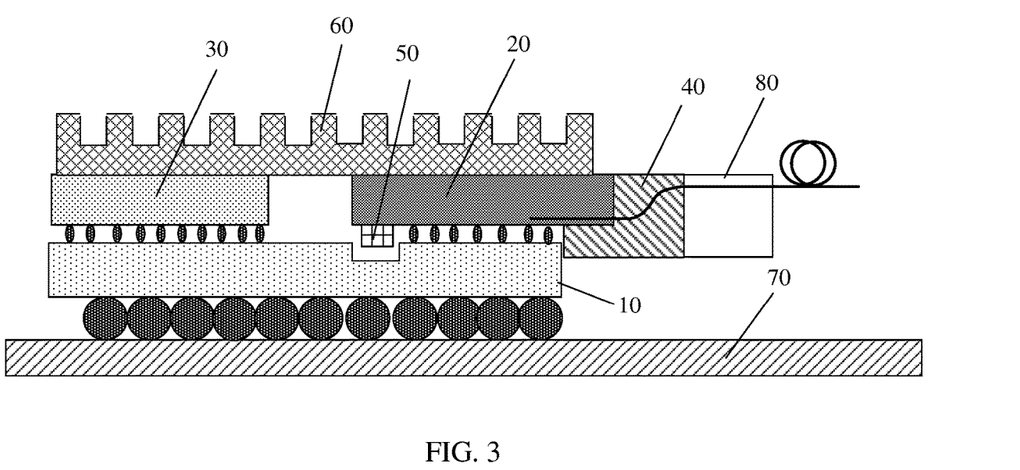
FIG. 3 is a schematic structural diagram of an optical module structure according to another embodiment of this application.

As shown in FIG. 3, in another embodiment of this application, the optical coupling structure 40 and the optical chip 20 are coupled through edge coupling. In this embodiment of this application, an optical waveguide in the optical coupling structure 40 is coupled to an optical waveguide in the optical chip 20 using a first end face of the optical chip 20 and the first vertical plane of the optical coupling structure 40. A waveguide direction that is of the optical waveguide in the optical chip 20 and that is at a coupling location faces the first vertical plane, and a waveguide direction that is of the optical waveguide in the optical coupling structure 40 and that is at the coupling location is parallel and opposite to the waveguide direction that is of the optical waveguide in the optical chip 20 and that is at the coupling location.

Figure 4:
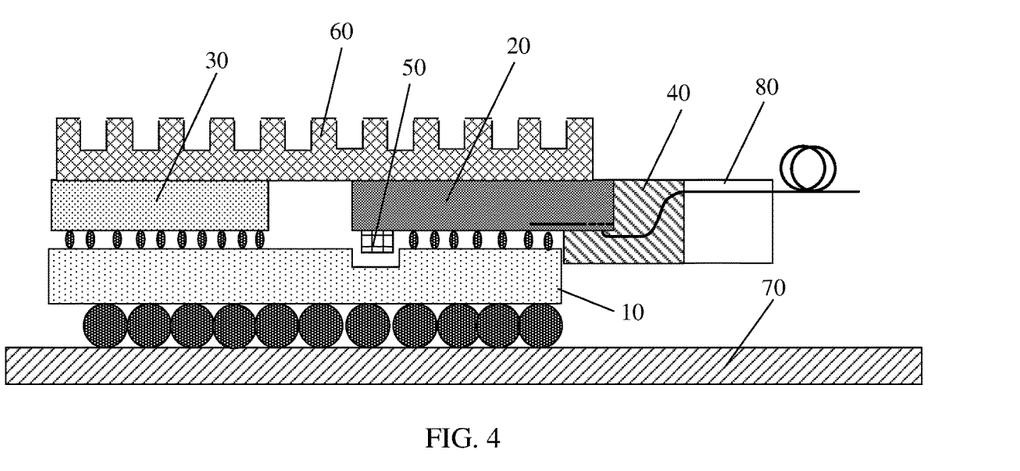
FIG. 4 is a schematic structural diagram of an optical module structure according to still another embodiment of this application.

As shown in FIG. 4, in another embodiment of this application, the optical coupling structure 40 and the optical chip 20 are coupled through vertical coupling. In this embodiment of this application, an optical waveguide in the optical coupling structure 40 is coupled to an optical waveguide in the optical chip 20 using the first reference plane of the optical chip 20 and the second reference plane of the optical coupling structure 40. A waveguide direction that is of the optical waveguide in the optical chip 20 and that is at a coupling location faces the first vertical plane, and a waveguide direction that is of the optical waveguide in the optical coupling structure 40 and that is at the coupling location is perpendicular to the first reference plane and faces the first reference plane.

It should be noted that, based on the foregoing embodiments, in an embodiment of this application, when the optical coupling structure 40 and the optical chip 20 are coupled through vertical coupling, a grating coupler is further disposed between an optical waveguide in the optical coupling structure and an optical waveguide in the optical chip 20.

Figure 5:
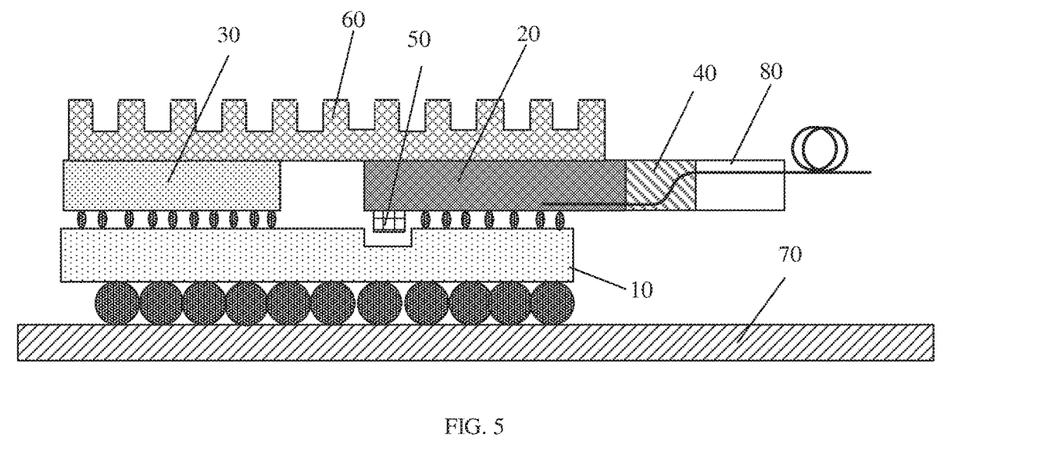
FIG. 5 is a schematic structural diagram of an optical module structure according to yet another embodiment of this application.

As shown in FIG. 5, in still another embodiment of this application, the optical coupling structure 40 is a rectangular structure, is fastened to the substrate 10, has only a first vertical plane, and has no second reference plane and no second alignment mark. During specific coupling, the optical chip 20 is coupled to the optical coupling structure 40 using an end face on a side that is of the optical chip 20 and that faces the optical coupling structure 40 and the first vertical plane (namely, an end face on a side that is of the optical coupling structure 40 and that faces the optical chip 20) of the optical coupling structure 40. In this embodiment of this application, a waveguide direction of an optical waveguide in the optical chip 20 is parallel to a direction from the optical chip 20 to the optical coupling structure 40, and is toward the optical coupling structure 40. A waveguide direction of an optical waveguide in the optical coupling structure 40 is parallel to a direction from the optical coupling structure 40 to the optical chip 20, and is toward the optical chip 20.

Based on any one of the foregoing embodiments, in an embodiment of this application, the optical chip 20 and the electrical chip 30 are located side by side on the substrate 10, and the optical chip 20 and the substrate 10 are fixedly connected in a same manner as the electrical chip 30 and the substrate 10, to ensure that fastening of the optical chip 20 and the electrical chip 30 can be performed on a same production line, thereby improving generation efficiency of the optical module structure, and reducing generation costs.

Optionally, the optical chip 20 and the substrate 10 are fixedly connected through soldering, and the electrical chip 30 and the substrate 10 are also fixedly connected through soldering. Further, in an implementation of this application, the optical chip 20 is a flip chip, and the electrical chip 30 is also a flip chip. The flip chip technology is a technology of soldering a naked chip to the substrate 10. During specific soldering, a surface of the chip has a bonding pad and solder, a surface of the substrate 10 also has a corresponding bonding pad. In a soldering process, the chip is flipped over, the surface having the solder is attached downward to the substrate 10, and is soldered to the substrate 10 in a manner such as reflow soldering or eutectic soldering.

Based on any one of the foregoing embodiments, in an embodiment of this application, a light source chip 50 is fastened on the side that is of the optical chip 20 and that faces the substrate 10, a surface on a side that is of the substrate 10 and that faces the optical chip 20 has a first groove 25, and the light source chip 50 is located in the first groove 25. That is, a part that is of the light source chip 50 and that protrudes from the surface on the side that is of the optical chip 20 and that faces the substrate 10 is located in the first groove 25 such that when the light source chip 50 is integrated into the optical module structure, the encapsulation density of the optical module is increased, and a volume that is of the optical module structure and that is increased due to introduction of the light source chip 50 is reduced. Optionally, in this embodiment of this application, there is a second groove on the surface on the side that is of the optical chip 20 and that faces the substrate 10, and light source chip 50 is located in the second groove to further reduce the volume that is of the optical module structure and that is increased due to the introduction of the light source chip 50.

Based on the foregoing embodiments, in a specific implementation of this application, the light source chip 50 and the optical chip 20 are fixedly connected through soldering such that fastening of the optical chip 20 to the light source chip 50 and fastening of the optical chip 20 to the substrate 10 can be completed on a same production line to improve production efficiency.

In another embodiment of this application, alternatively, a light source may be integrated into the optical chip 20 by disposing a monolithically integrated light source on the optical chip 20. This is not limited in this application, and determined based on a situation.

Based on any one of the foregoing embodiments, in an embodiment of this application, the optical module structure further includes a heat dissipation structure 60 located on sides that are of the optical chip 20 and the electrical chip 30 and that are away from the substrate 10. The heat dissipation structure 60 is at least partially in contact with the optical chip 20, and at least partially in contact with the electrical chip 30 such that the optical module structure can dissipate heat of the optical chip 20 and the electrical chip 30 at the same time using the heat dissipation structure 60, improving heat dissipation efficiency of the optical module structure. Optionally, in a specific embodiment of this application, the heat dissipation structure 60 completely covers a surface on a side that is of the electrical chip 30 and that is away from the substrate 10 to increase a contact area between the heat dissipation structure 60 and the electrical chip 30, thereby improving heat dissipation efficiency of the electrical chip 30. Similarly, the heat dissipation structure 60 completely covers a surface on a side that is of the optical chip 20 and that is away from the substrate 10 to increase a contact area between the heat dissipation structure 60 and the optical chip 20, thereby improving heat dissipation efficiency of the optical chip 20.

Based on any one of the foregoing embodiments, in an embodiment of this application, the optical module structure further includes a circuit board 70 that is fixedly connected to the substrate 10 and that is located on a side of the substrate 10 that is away from the optical chip 20 and the electrical chip 30. Optionally, the circuit board 70 is a printed circuit board (PCB), and the circuit board 70 and the substrate 10 are fixedly connected through soldering.

In conclusion, according to the optical module structure provided in the embodiments of this application, the optical chip 20 and the electrical chip 30 are fastened side by side to the substrate 10 in a hybrid encapsulation manner to increase the encapsulation density of the optical module structure such that the channels of the optical module structure are increased when the area is the same, to support the optical interconnection for a large amount of data.

In addition, according to the optical module structure provided in the embodiments of this application, the first reference plane is aligned with the second reference plane, and the first alignment mark is aligned with the second alignment mark. This passive alignment manner that is convenient and quick is used such that the error caused by the manual alignment is avoided, and the alignment precision is relatively high.

In addition, according to the optical module structure provided in the embodiments of this application, the substrate 10 and the optical chip 20, the substrate 10 and the electrical chip 30, the optical chip 20 and the heat dissipation structure 60, and the substrate 10 and the circuit board 70 are all soldering such that fastening of components in the optical module structure can be performed on a same production line, improving production efficiency of the optical module structure, and reducing production costs.

Figure 6:
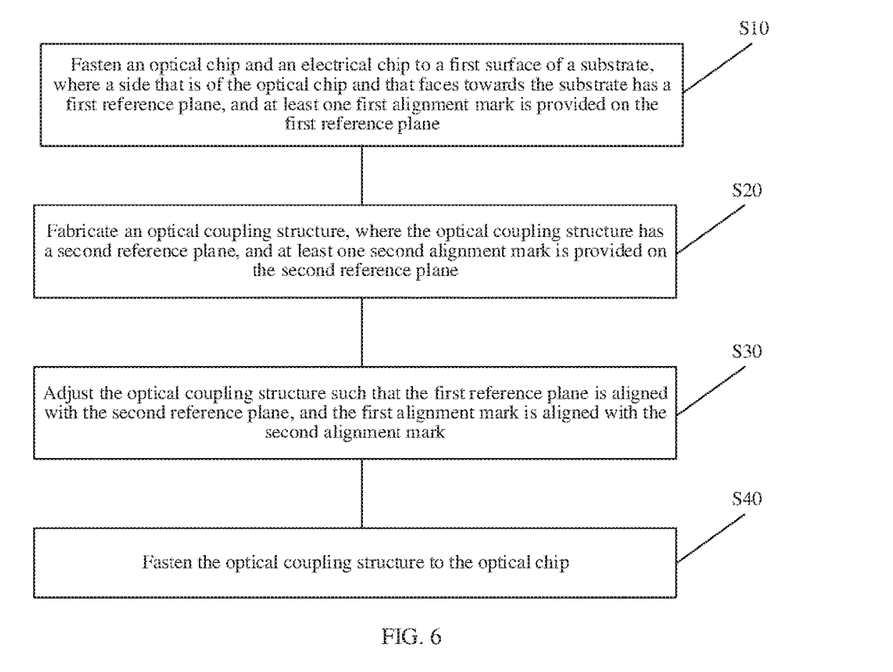
FIG. 6 is a flowchart of an encapsulation method for an optical module structure according to an embodiment of this application.

In addition, an embodiment of this application further provides an encapsulation method for an optical module structure, applied to the optical module structure provided in any one of the foregoing embodiments of this application. As shown in FIG. 6, the encapsulation method provided in this embodiment of this application includes the following steps.

Step S10. Fasten an optical chip and an electrical chip to a first surface of a substrate, where a side that is of the optical chip and that faces the substrate has a first reference plane, and at least one first alignment mark is provided on the first reference plane.

Further, in an embodiment of this application, the fastening an optical chip and an electrical chip to a first surface of a substrate includes separately fastening the optical chip and the electrical chip to the first surface of the substrate. Optionally, the optical chip and the first surface of the substrate are fixedly connected through soldering, and the electrical chip and the first surface of the substrate are also fixedly connected through soldering such that fastening between the optical chip and the substrate and fastening between the electrical chip and the substrate are completed on a same production line, improving encapsulation efficiency of the optical module structure, and reducing costs of the optical module structure.

Based on any one of the foregoing embodiments, in an embodiment of this application, there is an electrical connection line in the substrate, and the electrical chip is electrically connected to the optical chip using the electrical connection line such that during specific application, an electrical signal generated or amplified by the electrical chip can be transmitted to the optical chip using the substrate, the optical chip converts the electrical signal into an optical signal, transmits the optical signal to the optical coupling structure, and transmits the optical signal out using an optical fiber array that is in communication connection with the optical coupling structure.

Further, in an embodiment of this application, the optical chip is a chip having an optical signal transmission/processing function, and has an electrical signal input/output interface and an optical signal input/output interface, thereby implementing mutual conversion between an optical signal and an electrical signal. The electrical chip is a chip including a device such as a drive or a trans-impedance amplifier, and is configured to generate, amplify, and/or receive an electrical signal. The optical coupling structure is located between the optical chip and the optical fiber array to implement optical coupling between the optical chip and the optical fiber array.

Step S20. Fabricate an optical coupling structure, where the optical coupling structure has a second reference plane, and at least one second alignment mark is provided on the second reference plane.

Further, in an embodiment of this application, the fabricating an optical coupling structure includes providing an optical coupling medium, and writing an optical waveguide into the optical coupling medium using a femtosecond laser direct writing technology to form the optical coupling structure.

Based on the foregoing embodiments, in another embodiment of this application, fabricating an optical coupling structure further includes forming a metal layer on a surface of the optical coupling medium. Optionally, a formation process for the metal layer is an evaporation process. However, this is not limited in this application, and determined based on a situation.

Based on any one of the foregoing embodiments, in an embodiment of this application, a material of the optical coupling structure is glass, and both a waveguide and the alignment mark of the optical coupling structure may be fabricated using a laser writing waveguide technique. This is not limited in this application, and determined based on a situation.

Step S30. Adjust the optical coupling structure such that the first reference plane is aligned with the second reference plane, and the first alignment mark is aligned with the second alignment mark.

In an embodiment of this application, that the first reference plane is aligned with the second reference plane and the first alignment mark is aligned with the second alignment mark includes that, in a direction perpendicular to a surface of the substrate, a projection of the first reference plane at least partially overlaps a projection of the second reference plane, and a projection of the first alignment mark coincides with a projection of the second alignment mark, to implement alignment in a direction from the optical chip to the optical coupling structure in a plane parallel to the surface of the substrate. In another embodiment of this application, that the first reference plane is aligned with the second reference plane further includes that, a distance between the first reference plane and the second reference plane satisfies a preset requirement (such as zero or another preset value) to implement alignment between the optical chip and the optical coupling structure in the direction perpendicular to the surface of the substrate. However, this is not limited in this application, and is determined based on a situation.

Based on any one of the foregoing embodiments, in an embodiment of this application, the optical coupling structure has a first vertical plane perpendicular to the second reference plane, and when the optical chip is optically coupled to the optical coupling structure, the first vertical plane is aligned with an end face on a side that is of the optical chip and that faces the optical coupling structure. Further, in an implementation of this application, the first vertical plane is in direct contact with the end face on the side that is of the optical chip and that faces the optical coupling structure, to implement the alignment in the direction from the optical chip to the optical coupling structure in the plane parallel to the surface of the substrate.

It should be noted that, in this embodiment of this application, the optical coupling structure and the optical chip may be coupled through evanescent wave coupling, edge coupling, or vertical coupling. This is not limited in this application.

It should be further noted that, based on the foregoing embodiments, in an embodiment of this application, when the optical coupling structure and the optical chip are coupled through vertical coupling, a grating coupler is further disposed between an optical waveguide in the optical coupling structure and an optical waveguide in the optical chip.

Step S40. Fasten the optical coupling structure to the optical chip.

It should be noted that, in this embodiment of this application, a light source of the optical module structure may be an external light source, or may be integrated into the optical module structure. When the light source is integrated into the optical module structure, in an embodiment of this application, before fastening an optical chip and an electrical chip to a first surface of a substrate, the method further includes forming a second groove on the optical chip, and fastening a light source chip in the second groove, and forming a first groove on the substrate such that the light source chip is located in the first groove after the optical chip and the electrical chip are fastened to the first surface of the substrate.

It should be noted that, in this embodiment of this application, during fastening a light source chip in the second groove, optionally, the light source chip is fastened to the optical chip by flip-chip bonding method, but this is not limited in this application. In another embodiment of this application, the light source may alternatively be integrated into the optical chip in a form of a monolithically integrated light source, and determined based on a situation.

Based on any one of the foregoing embodiments, in an embodiment of this application, the encapsulation method further includes fastening a heat dissipation structure to sides that are of the optical chip and the electrical chip and that are away from the substrate. The heat dissipation structure is at least partially in contact with the optical chip, and at least partially in contact with the electrical chip such that the optical module structure can dissipate heat of the optical chip and the electrical chip at the same time using the heat dissipation structure, improving heat dissipation efficiency of the optical module structure. Optionally, in a specific embodiment of this application, the heat dissipation structure completely covers a surface on a side that is of the electrical chip and that is away from the substrate, to increase a contact area between the heat dissipation structure and the electrical chip, thereby improving heat dissipation efficiency of the electrical chip. Similarly, the heat dissipation structure completely covers a surface on a side that is of the optical chip and that is away from the substrate to increase a contact area between the heat dissipation structure and the optical chip, thereby improving heat dissipation efficiency of the optical chip.

Based on any one of the foregoing embodiments, in an embodiment of this application, the encapsulation method further includes fastening a circuit board to a side, of the substrate, away from the optical chip and the electrical chip. Optionally, the circuit board is a PCB circuit board, and the circuit board and the substrate are fixedly connected through soldering.

In conclusion, according to a fabrication method for the optical module structure provided in this embodiment of this application, the optical chip and the electrical chip are fastened side by side to the substrate in a hybrid encapsulation manner to increase encapsulation density of the optical module structure such that channels of the optical module structure are increased when an area is the same to support an optical interconnection for a large amount of data.

In addition, according to the encapsulation method for the optical module structure provided in this embodiment of this application, the first reference plane is aligned with the second reference plane, and the first alignment mark is aligned with the second alignment mark. This passive alignment manner that is convenient and quick is used such that an error caused by manual alignment is avoided, and alignment precision is relatively high.

In addition, according to the encapsulation method for the optical module structure provided in this embodiment of this application, the substrate and the optical chip, the substrate and the electrical chip, the optical chip and the light source chip, and the substrate and the circuit board, each are fixedly connected through soldering such that fastening of components in the optical module structure can be performed on a same production line, improving production efficiency of the optical module structure, and reducing production costs.

The embodiments in this specification are all described in a progressive manner. For same or similar parts in the embodiments, refer to these embodiments, and each embodiment focuses on a difference from other embodiments. The apparatus disclosed in the embodiments is described relatively simply because it corresponds to the method disclosed in the embodiments, and for portions related to those of the method, refer to the descriptions of the method.

The embodiments disclosed above are described to enable a person skilled in the art to implement or use this application. Various modifications made to the embodiments will be obvious to a person skilled in the art, and the general principles defined herein may also be implemented in other embodiments without departing from the spirit or scope of this application. Therefore, this application is not intended to be limited to these embodiments illustrated herein, but shall be construed in the widest scope consistent with the principles and novel features disclosed herein.

What is claimed is:
1. An optical module structure comprising:
a substrate;

an optical chip fixedly coupled to the substrate, wherein a first side of the optical chip facing the substrate comprises a first plurality of physical alignment marks on a first reference plane;

an electrical chip fixedly coupled to the substrate; and an optical coupling structure fixedly coupled to the optical chip, wherein the optical coupling structure comprises a second plurality of physical alignment marks on a second reference plane, wherein the first plurality of physical alignment marks is aligned with the second plurality of physical alignment marks in an x-direction, and wherein the first reference plane is aligned with the second reference plane in a y-direction.

2. The optical module structure of claim 1, wherein the optical coupling structure further comprises a first vertical plane perpendicular to the second reference plane, wherein the optical chip is optically coupled to the optical coupling structure, and wherein the first vertical plane is aligned with an end face on a second side of the optical chip facing the optical coupling structure.

3. The optical module structure of claim 2, wherein the optical coupling structure and the optical chip are coupled using evanescent wave coupling, edge coupling, or vertical coupling.

4. The optical module structure of claim 3, wherein the optical coupling structure and the optical chip are coupled using the evanescent wave coupling, wherein the optical coupling structure further comprises a first optical waveguide, wherein the optical chip comprises a second optical waveguide that is coupled to the first optical waveguide using the first reference plane and the second reference plane, wherein a first waveguide direction of the second optical waveguide at a coupling location faces the first vertical plane, and wherein a second waveguide direction of the first optical waveguide at the coupling location is parallel and opposite to the first waveguide direction.

5. The optical module structure of claim 3, wherein the optical coupling structure and the optical chip are coupled using the edge coupling, wherein the optical coupling structure comprises a first optical waveguide, wherein the optical chip comprises a second optical waveguide that is coupled to the first optical waveguide using a first end face of the optical chip and the first vertical plane, wherein a first waveguide direction of the second optical waveguide at a coupling location faces the first vertical plane, and wherein a second waveguide direction of the first optical waveguide at the coupling location is parallel and opposite to the first waveguide direction.

6. The optical module structure of claim 3, wherein the optical coupling structure and the optical chip are coupled using the vertical coupling, wherein the optical coupling structure comprises a first optical waveguide, wherein the optical chip comprises a second optical waveguide coupled to the first optical waveguide using the first reference plane and the second reference plane, wherein a first waveguide direction of the second optical waveguide at a coupling location faces the first vertical plane, and wherein a second waveguide direction of the first optical waveguide at the coupling location is perpendicular to the first reference plane and faces the first reference plane.

7. The optical module structure of claim 3, wherein the optical coupling structure and the optical chip are coupled using the vertical coupling, wherein the optical coupling structure further comprises a first optical waveguide, wherein the optical chip comprises a second optical waveguide, and wherein the optical circuit structure further comprises a grating coupler disposed between the first optical waveguide and the second optical waveguide.

8. The optical module structure of claim 1, wherein the optical chip and the electrical chip are located side by side on the substrate, and wherein the optical chip and the substrate are fixedly coupled in a same manner as the electrical chip and the substrate.

9. The optical module structure of claim 1, further comprising a light source chip on the optical chip.

10. The optical module structure of claim 1, further comprising a light source chip fastened on the first side of the optical chip, wherein the substrate comprises a first groove on a surface of the substrate facing the optical chip, and wherein the light source chip is located in the first groove.

11. The optical module structure of claim 1, further comprising a heat dissipation structure located on sides of the optical chip and the electrical chip that are away from the substrate, and wherein the heat dissipation structure is in contact with the optical chip and the electrical chip.

* * * * *